No. 802,846. PATENTED OCT. 24, 1905.
J. L. DE GOOD.
HEADLIGHT HOLDER FOR AUTOMOBILES.
APPLICATION FILED AUG. 8, 1904.
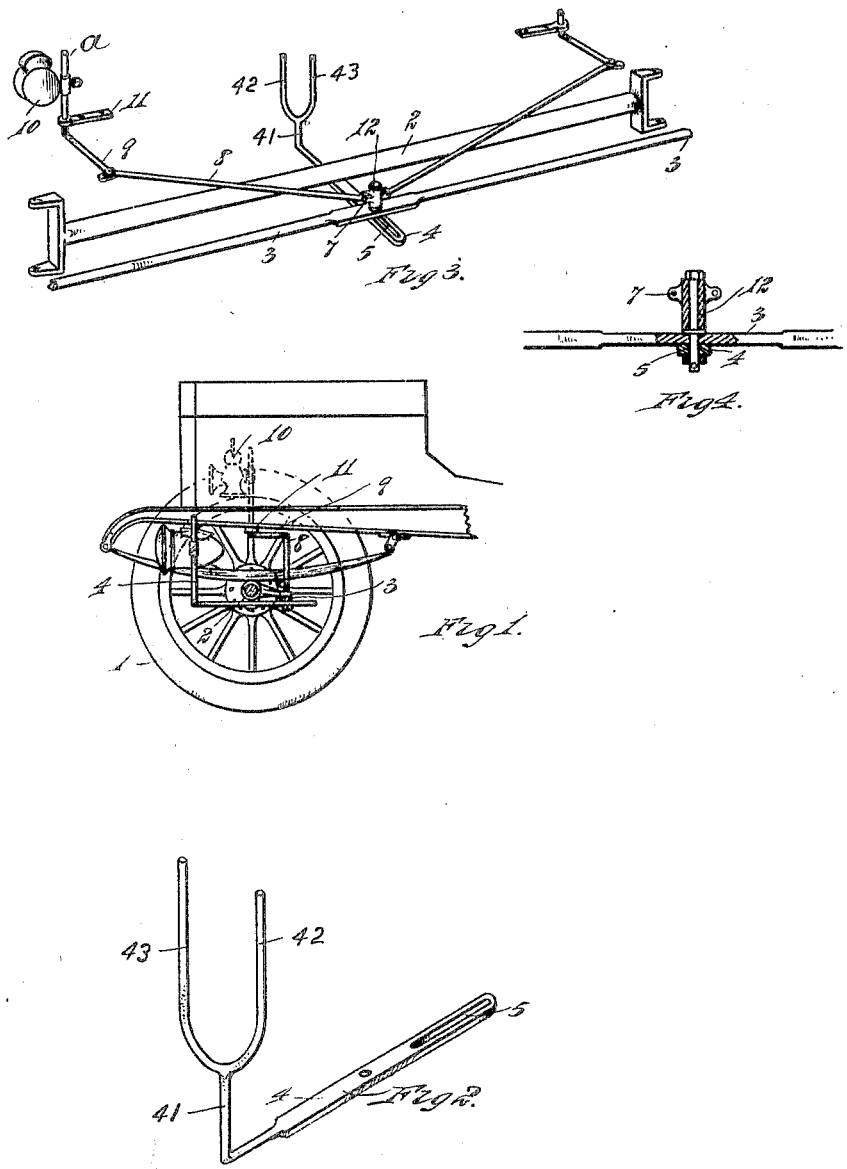
WITNESSES
T. J. Massey
Lotta Lee Hayton.
INVENTOR
Joseph L. De Good
By Parker W. Burton
Attorneys.

UNITED STATES PATENT OFFICE.

JOSEPH L. DE GOOD, OF DETROIT, MICHIGAN, ASSIGNOR OF ONE-HALF TO ROBERT L. JOHNSON AND CHARLES H. JOHNSON, OF DETROIT, MICHIGAN.

HEADLIGHT-HOLDER FOR AUTOMOBILES.

No. 802,846.     Specification of Letters Patent.     Patented Oct. 24, 1905.

Application filed August 8, 1904. Serial No. 220,153.

*To all whom it may concern:*

Be it known that I, JOSEPH L. DE GOOD, a citizen of the United States, residing at Detroit, county of Wayne, State of Michigan, have invented a certain new and useful Improvement in Headlight-Holders for Automobiles; and I declare the following to be a full, clear, and exact description of the invention, such as will enable others skilled in the art to which it pertains to make and use the same, reference being had to the accompanying drawings, which form a part of this specification.

This invention relates to headlight-holders for automobiles.

It has for its object an improved headlight-holder arranged to hold either a central headlight or side headlights, or both, and to turn or direct the lanterns so that the rays of light are projected in a direction to correspond with that of the guiding-wheels as distinguished from the true fore-and-aft axial line of the carriage-body.

In the drawings, Figure 1 is an elevation showing a central headlight and indicating a side light. Fig. 2 is a perspective of a forked lever which carries a central headlight. Fig. 3 is a perspective of the operative part. Fig. 4 is a sectional view of the coupling.

1 indicates a front wheel mounted on a pivotal extension of an axle 2, that is secured to the frame of the vehicle either with or without interposed springs, but in a position of fixed angularity with respect to the side-bars or frame-body.

3 indicates a parallel bar employed to turn the wheels and steer the vehicle.

To the under side of the axle is pivotally secured a lever 4, the rear end of which is provided with a slot 5. A pin on the parallel bar engages through slot 5 and oscillates the lever 4. The front end of the lever 4 is provided with a vertical post 41, which is provided with suitable supports 42 43 for the lamp, adapted to engage through side lugs or side brackets thereon. The shifting of the parallel bar of the steering apparatus turns the post on the pin which extends through the slot 5 and turns the lamp, which always emits its rays of light in a direction in the nearest possible approximation in the course to be traveled by the vehicle. To provide for a similar and contemporaneous shifting of the side lights, which are usually carried upon the body of the vehicle, and to obviate any disturbance of the lamp and its connections, due to the vibration of the carriage-body on the springs, a post *a*, mounted on the outer end of crank-arm 9, is passed through a bracket 11, which is fixed to the carriage-body. On this post the side light is fixed. The bracket 11 slides up and down the post *a* as the body responds to the vibratory impulse of the springs without affecting the steadiness or rotatability of the lamp. The crank-arm is connected by a link member 8 to a coupling 7, which is pivoted by pin 12 to the parallel bar 3.

What I claim is—

1. In combination with the steering apparatus of a motor-vehicle, a lamp-supporting lever pivotally connected therewith, one end thereof serving as a bracket for the lamp and the other end thereof being pierced with a longitudinal slot for the engagement therethrough of a pin, and a lever member parallel with the axle and connected therewith, said member carrying a pin projecting through said slot and arranged to control thereby the movement of said lamp-supporting lever, substantially as described.

2. In combination with the steering apparatus of a motor-vehicle, a lever member pivotally mounted thereon, one end of said lever member serving as a support for the lamp and the other end having a slot therein, and means carried by the axle of the steering-wheels and engaging through said slot whereby said lever is actuated in either direction by a corresponding movement of said steering-wheel axle, substantially as described.

3. In combination with the steering apparatus of a motor-vehicle, a lever member pivotally mounted thereon, adapted to carry a lamp on its forward end and having its other end prepared for a sliding engagement with a controlling member, and means carried by the steering-axle arranged to slidingly engage said end of the pivoted lever member, substantially as described.

In testimony whereof I sign this specification in the presence of two witnesses.

JOSEPH L. DE GOOD.

Witnesses:
WILLIAM M. SWAN,
MAY E. KOTT.